US011238303B2

(12) United States Patent
Tsai (10) Patent No.: US 11,238,303 B2
(45) Date of Patent: Feb. 1, 2022

(54) IMAGE SCANNING METHOD FOR METALLIC SURFACE AND IMAGE SCANNING SYSTEM THEREOF

(71) Applicant: GETAC TECHNOLOGY CORPORATION, Hsinchu County (TW)

(72) Inventor: Kun-Yu Tsai, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 66 days.

(21) Appl. No.: 16/848,406

(22) Filed: Apr. 14, 2020

(65) Prior Publication Data

US 2020/0363331 A1 Nov. 19, 2020

Related U.S. Application Data

(60) Provisional application No. 62/848,216, filed on May 15, 2019.

(51) Int. Cl.
*G01N 21/3581* (2014.01)
*G06K 9/46* (2006.01)
(Continued)

(52) U.S. Cl.
CPC .......... *G06K 9/4661* (2013.01); *G01J 3/2823* (2013.01); *G01N 21/01* (2013.01); *G01N 21/3581* (2013.01); *G01N 21/8851* (2013.01); *G01N 21/952* (2013.01); *G01N 21/956* (2013.01); *G06F 17/16* (2013.01); *G06K 9/00201* (2013.01); *G06K 9/00208* (2013.01); *G06K 9/2018* (2013.01); *G06K 9/2054* (2013.01); *G06K 9/3208* (2013.01);
(Continued)

(58) Field of Classification Search
CPC ............. G06K 9/6257; G06K 9/00201; G06K 9/00208; G06K 9/2018; G06K 9/2054; G06K 9/3208; G06K 9/3233; G06K 9/4661; G01N 21/3581; G01N 21/8851; G01N 21/956; G06N 3/04; G06N 3/0472; G06N 3/063; G06N 3/08
See application file for complete search history.

(56) References Cited

U.S. PATENT DOCUMENTS 8,854,615 B2 * 10/2014 Tanabe ................ G01N 21/95
356/239.1
10,324,044 B2 * 6/2019 Marivoet ........... G01N 21/9505
10,890,441 B2 * 1/2021 Sonoda ................. G01B 11/30

* cited by examiner

*Primary Examiner* — David P Porta
*Assistant Examiner* — Fani Boosalis (57) ABSTRACT

An image scanning method for a metallic surface and an image scanning system thereof are provided. The method includes sequentially moving one of a plurality of areas on a metallic surface of an object to a detection position, providing far infrared light by a light source component facing the detection position, wherein a light wavelength of the far infrared light is associated with the object, the far infrared light illuminating the detection position with a light incident angle of less than or equal to 90 degrees relative to a normal line of the area located at the detection position, and capturing a detection image of each of the areas sequentially located at the detection position by a photosensitive element according to the far infrared light, wherein the photosensitive element faces the detection position and a photosensitive axis of the photosensitive element is parallel to the normal line.

26 Claims, 8 Drawing Sheets

(51) Int. Cl.
*G06T 7/586* (2017.01)
*G06T 7/00* (2017.01)
*G06K 9/00* (2006.01)
*G06K 9/20* (2006.01)
*G06K 9/32* (2006.01)
*G06K 9/62* (2006.01)
*G06N 3/08* (2006.01)
*G01N 21/88* (2006.01)
*G06T 7/40* (2017.01)
*G06N 3/04* (2006.01)
*G06T 7/11* (2017.01)
*G01J 3/28* (2006.01)
*G01N 21/956* (2006.01)
*G06T 7/45* (2017.01)
*G06F 17/16* (2006.01)
*G06N 3/063* (2006.01)
*G01N 21/01* (2006.01)
*G01N 21/952* (2006.01)

(52) U.S. Cl.
CPC ......... *G06K 9/3233* (2013.01); *G06K 9/6257* (2013.01); *G06N 3/04* (2013.01); *G06N 3/0472* (2013.01); *G06N 3/063* (2013.01); *G06N 3/08* (2013.01); *G06T 7/0004* (2013.01); *G06T 7/11* (2017.01); *G06T 7/40* (2013.01); *G06T 7/45* (2017.01); *G06T 7/586* (2017.01); *G06T 7/97* (2017.01); *G01N 2021/8887* (2013.01); *G06T 2207/10152* (2013.01); *G06T 2207/20081* (2013.01); *G06T 2207/20084* (2013.01)

IMAGE SCANNING METHOD FOR METALLIC SURFACE AND IMAGE SCANNING SYSTEM THEREOF

CROSS-REFERENCE TO RELATED APPLICATIONS

This application claims priority from U.S. Patent Application Ser. No. 62/848,216, filed on May 15, 2019, the entire disclosure of which is hereby incorporated by reference.

BACKGROUND OF THE INVENTION

Field of the Invention

The present disclosure relates to an image scanning method for a surface of an object and an image scanning system thereof, and more particularly, to an image scanning method for a metallic surface of an object having an attachment and an image scanning system thereof.

Description of the Prior Art

The defect detection for products is a critical step in the industrial manufacturing process, and defective products cannot be sold. One conventional defect detection method is manually inspecting a product under test by naked eyes or by touching of hands, so as to determine whether a product contains defects, such as recesses, scratches, color differences or damages. However, for an object surface with a surface attachment, it is quite difficult to manually inspect products by naked eyes whether a metallic surface under the attachment contains a defect, in a way that misjudgment can be easily resulted, leading to the problem of an unmanageable product yield rate.

SUMMARY OF THE INVENTION

The present disclosure provides an image scanning method for a metallic surface. The method includes sequentially moving one of a plurality of areas on a metallic surface of an object to a detection position, providing far infrared light by a light source component facing the detection position, wherein a light wavelength of the far infrared light is associated with the object, the far infrared light illuminating the detection position with a light incident angle of less than or equal to 90 degrees relative to a normal line of the area located at the detection position, and capturing a detection image of each of the areas sequentially located at the detection position by a photosensitive element according to the far infrared light, wherein the photosensitive element faces the detection position and a photosensitive axis of the photosensitive element is parallel to the normal line.

The present disclosure provides an image scanning system for a metallic surface. The system includes a driver component, a light source component and a photosensitive element. The driver component carries an object, a metallic surface of the object is divided into a plurality of areas along an extension direction, and the driver component is further used for sequentially moving one of the plurality of areas on the metallic surface to a detection position. The light source component is configured to face the detection position, and provides far infrared light to illuminate the detection position, wherein a light wavelength of the far infrared light is associated with the object and a light incident angle of the far infrared light relative to a normal line of the area located at the detection position is less than or equal to 90 degrees. The photosensitive element is configured to face the detection position, and captures a detection image of each of the areas sequentially located at the detection position, wherein a photosensitive axis of the photosensitive element is parallel to the normal line.

DETAILED DESCRIPTION OF THE EMBODIMENTS

Figure 1:
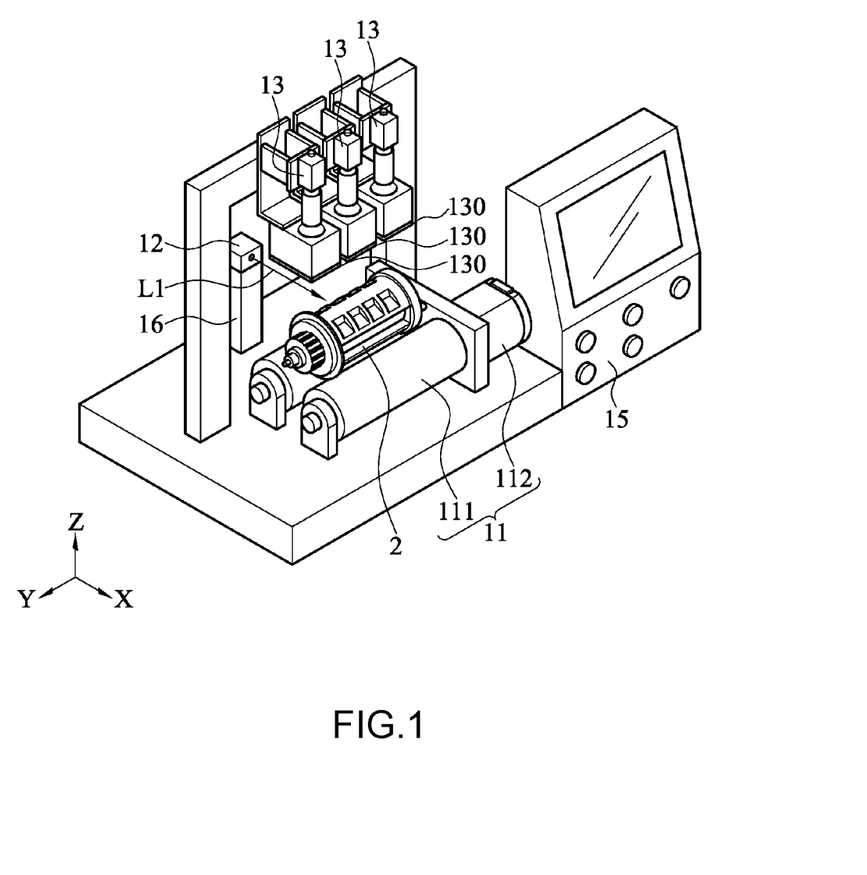
FIG. 1 is a schematic diagram of an image scanning system for a metallic surface according to an embodiment of the present disclosure.

FIG. 1 shows a schematic diagram of an image scanning system for a metallic surface according to an embodiment of the present disclosure. Referring to FIG. 1, the image scanning system for a metallic surface is suitable for scanning an object 2 so as to obtain at least one detection image of the object 2. In some embodiments, the object 2 includes a body and an attachment, wherein the body has a metallic surface and the attachment is located on the metallic surface of the body. In some embodiments, the attachment can be grease, stain, paint and so on. In some embodiments, a metallic surface 21 of the object 2 may contain at least one surface defect, and the corresponding detection image also presents an image block with the surface defect. Herein, the surface defect is a three-dimensional structure. Herein, the three-dimensional structure is in a scale of mm to μm.

Figure 2:
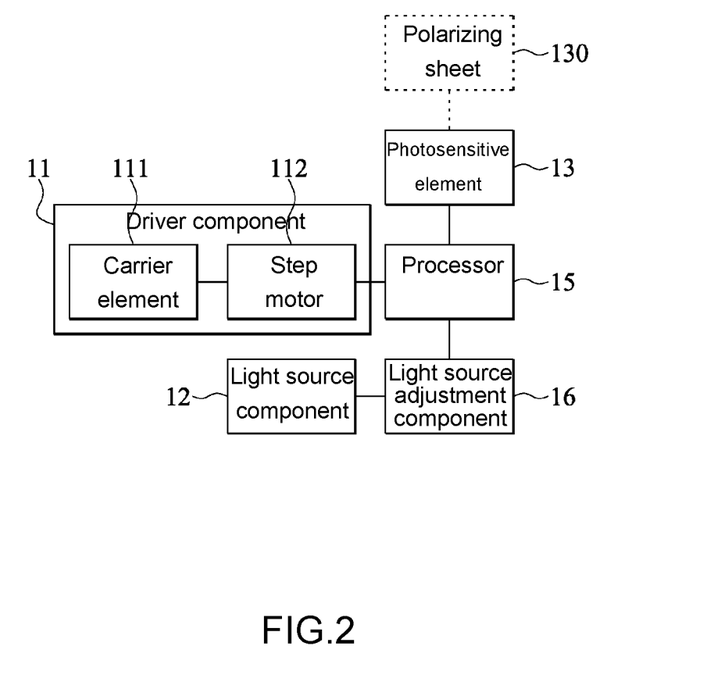
FIG. 2 is a function block diagram of the image scanning system for a metallic surface in FIG. 1 according to an embodiment.
Figure 3:
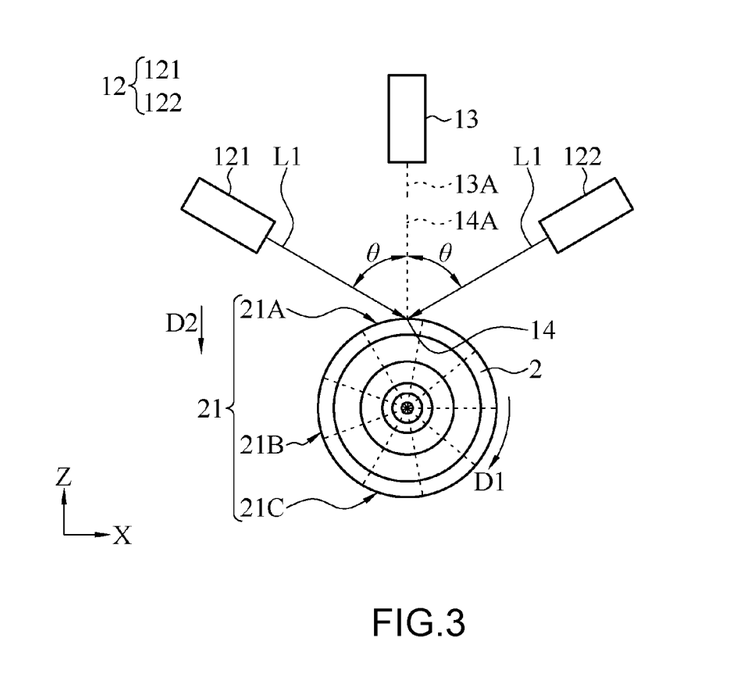
FIG. 3 is a schematic diagram of an implementation form of relative optical positions of the object, the light source component and the photosensitive element in FIG. 1.
Figure 4:
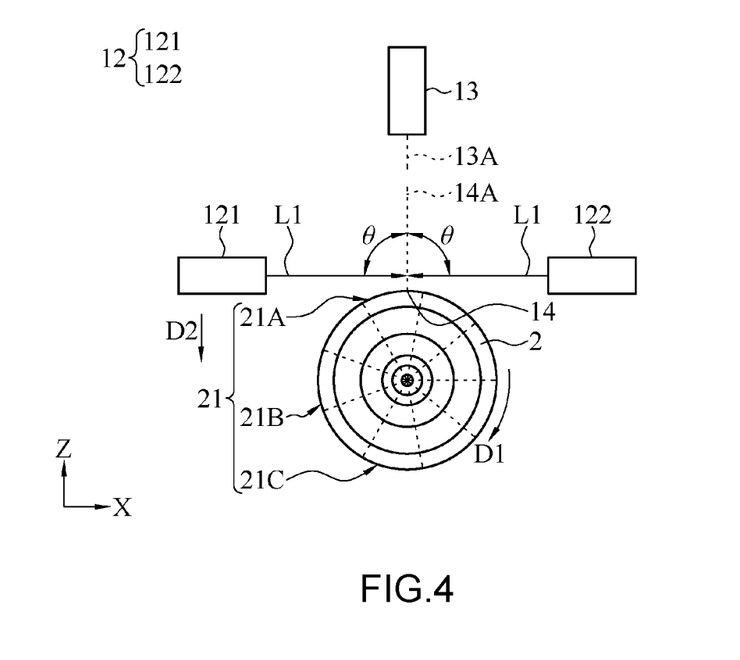
FIG. 4 is a schematic diagram of another implementation form of relative optical positions of the object, the light source component and the photosensitive element in FIG. 1.

The image scanning system for a metallic surface includes a driver component 11, a light source component 12 and a photosensitive element 13. Referring to FIG. 1 to FIG. 4, FIG. 2 shows a function block diagram of an image scanning system for a metallic surface in FIG. 1 according to an embodiment, and FIGS. 3 and 4 respectively show schematic diagrams of two implementation forms of relative optical positions of the object 2, the light source component 12 and the photosensitive element 13 in FIG. 1. The light source component 12 and the photosensitive element 13 face a detection position 14 on the driver component 11. The driver component 11 carries the object 2 under detection. The object 2 has a metallic surface 21 which has an attachment thereon, and the metallic surface 21 of the object 2 is divided into a plurality of areas along an extension direction D1 of the metallic surface 21 of the object 2. Herein, the metallic surface 21 of the object 2 in FIG. 3 and FIG. 4 is, for example but not limited to, divided into nine areas, of which three areas 21A to 21C are denoted as an example. The metallic surface 21 of the object 2 can also be divided into areas in other quantities.

Referring to FIGS. 1 to 5, FIG. 5 shows a flowchart of an image scanning method for the metallic surface 21 according to an embodiment of the present disclosure. The image scanning system can perform a detection procedure. By performing the detection procedure, for the metallic surface 21 of the object 2 having a surface attachment, the image scanning system can obtain a detection image of the metallic surface 21 having a good degree of penetration with respect to the surface attachment. The driver component 11 sequentially moves one of the plurality of areas 21A to 21C on the metallic surface 21 of the object 2 to the detection position 14 (step S01) in the detection procedure, and the light source component 12 emits far infrared light L1 towards the areas 21A to 21C located at the detection position 14 in the detection procedure, wherein a light wavelength of the far infrared light L1 is associated with the object 2 (step S02). In other words, the object 2 includes a body having the metallic surface 21 and an attachment located on the metallic surface 21 of the body, and the light wavelength of the far infrared light L1 is greater than the thickness of the attachment. For instance, the light wavelength of the infrared light is, for example but not limited to, more than 3.5 $\mu$m, allowing the surface defect in a scale of $\mu$m on the metallic surface 21 to form an image in the detection image. As shown in FIG. 3 and FIG. 4, an included angle θ (hereinafter referred to as a light incident angle θ) between the incident direction of the far infrared light L1 and a normal line 14A of each of the areas 21A to 21C located at the detection position 14 is more than 0 degree and less than or equal to 90 degrees; that is to say, the far infrared light L1 illuminates the detection position 14 with the light incident angle θ of more than 0 degree and less than or equal to 90 degrees relative to the normal line 14A (step S03), such that the areas 21A to 21C on the metallic surface 21 are sequentially illuminated at the detection position 14 by the far infrared light L1 from a lateral or inclined direction. Moreover, the areas 21A to 21C on the metallic surface 21 sequentially face the photosensitive element 13. In some embodiments, the photosensitive axis 13A of the photosensitive element 13 is parallel to the normal line 14A, and the photosensitive element 13 receives diffused far infrared light generated by the light received on the areas 21A to 21C on the metallic surface 21, and captures, according to the diffused far infrared light, detection images of the areas 21A to 21C sequentially located at the detection position 14 (step S04). The processor 15 receives the detection image and accordingly performs detect detection, that is, determining whether the metallic surface 21 contains a surface defect (step S06).

Figure 5:
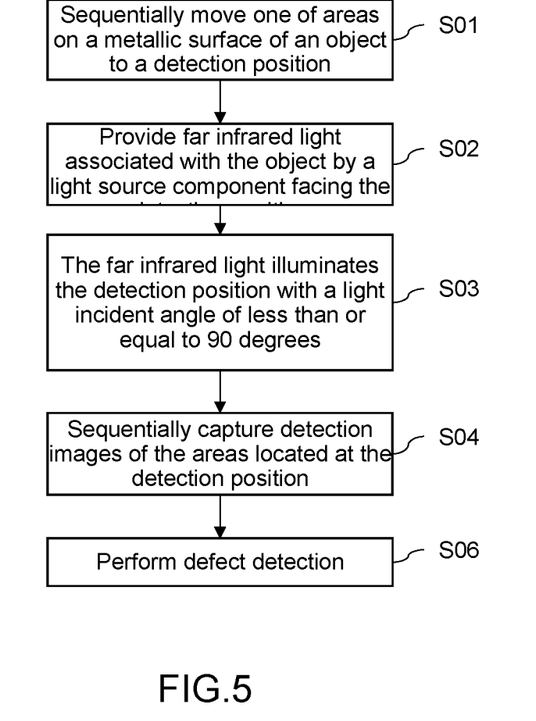
FIG. 5 is a flowchart of an image scanning method for a metallic surface according to an embodiment of the present disclosure.

For instance, taking the driver component 11 first moving the area 21A to the detection position 14 in step S01 for example, the far infrared light L1 provided by the light source component 12 illuminates the area 21A, the photosensitive element 13 captures the detection image of the area 21A in step S04, the driver component 11 next moves the object 2, the driver component 11 again moves the area 21B to the detection position 14 in step S01, the photosensitive element 13 again captures the detection image of the area 21B in step S04, the driver component 11 next moves the object 2, the driver component 11 again moves the area 21C to the detection position 14 in step S01, and the photosensitive element 13 again captures the detection image of the area 21C in step S04.

Hence, according to the associated thickness of the attachment on the metallic surface 21 of the object 2, the light wavelength of the far infrared light L1 is adjusted, such that the far infrared light L1 can be diffracted at or penetrate through the attachment on the metallic surface 21 and illuminate the metallic surface 21. Thus, the photosensitive element 13 or an inspector can generate the detection image by capturing the far infrared light L1 reflected or diffused by the metallic surface 21, allowing a surface defect in a scale of mm on the metallic surface 21 to form an image in the detection image, so as to accordingly determine whether the metallic surface 21 contains a surface defect.

Furthermore, apart from adjusting the selected wavelength of the far infrared light L1 according to the thickness of the attachment needing to be penetrated, image filtering of $\mu$m structures can also be performed according to a surface pattern of an object under detection. For example, if the surface of a sample contains 1 $\mu$m to 3 $\mu$m narrow and long marks or sand holes, such occurrences do not affect product quality. However, for structural detects more than 10 $\mu$m needing attention of product control staff, the selected wavelength of the far infrared light L1 can be an intermediate wavelength (e.g., 4 $\mu$m) so as to obtain optimal microstructure image filtering and low-noise image quality without affecting the detection for defects of larger sizes.

Again referring to FIG. 1 and FIG. 2, in this embodiment, the image scanning system can further include a light source adjustment component 16 coupled to the light source component 12.

In one embodiment, the light source adjustment component 16 can adjust the light intensity of the far infrared light L1 emitted by the light source component 12, so as to improve the issue of glare by adjusting the light intensity of the far infrared light L1 to further improve the quality of the detection image. For example, the light source adjustment component 16 can reduce the light intensity, so as to allow the photosensitive element 13 to obtain a detection image having less glare.

In another embodiment, according to different light incident angles θ, surface defects of different depths present different brightness levels in the detection image, and the intensity of glare produced by the far infrared light L1 also changes. In other words, by adjusting the light incident angle θ of the far infrared light L1 emitted by the light source component 12 using the light source adjustment component 16, glare can also be effectively reduced to improve the quality of the detection image.

In yet another embodiment, the light source adjustment component 16 can determine a light wave polarization direction of the far infrared light L1 emitted by the light source component 12, i.e., controlling the light source component 12 to output polarized far infrared light L1 for detection, so as to effectively reduce glare and improve the quality of the detection image.

In one embodiment, the image scanning system can selectively include a polarizing sheet 130 configured on the optical axis of the photosensitive element 13 and configured between the photosensitive element 13 and the detection position 14. Thus, the polarized far infrared light L1 emitted by the light source component 12, after passing through the surface of the object 2, undergoes polarization filtering of the polarizing sheet 130, so as to effectively prevent saturated glare upon the sensor 13 caused by strong infrared light, further improving the quality of the detection image.

In some embodiments, according to the light incident angle θ of more than 0 degree and less than or equal to 90 degrees, that is, according to the far infrared light L1 that is laterally incident or incident at an inclination, if the metallic surface 21 of the object 2 includes a groove-shaped or hole-shaped surface defect, the far infrared light L1 cannot illuminate the bottom of the surface defect and the surface defect appears as a shadow in the detection images of the areas 21A to 21C. Hence, the metallic surface 21 and the surface defect form an apparent contrast in the detection images, and the image scanning system or an inspector can determine whether the metallic surface 21 contains a surface defect according to whether the detection image includes a shadow, hence determining whether the metallic surface 21 of the object 2 contains surface defects, thereby significantly enhancing the efficiency of surface detection as well as alleviating the issue of human misjudgment.

In one embodiment, according to different light incident angles θ, surface defects of different depths present different brightness levels in the detection image. More specifically, as shown in FIG. 4, when the light incident angle θ is equal to 90 degrees, the incident direction of the far infrared light L1 is perpendicular to a depth direction D2 of the surface defect, and regardless of the depth of the surface defect, the surface defect on the metallic surface 21 is not illuminated by the far infrared light L1 due to being recessed and hence does not produce any reflected far infrared light or diffused far infrared light; more specifically, surface defects with deeper or shallower depths both present shadows in the detection image, such that the detection image has a less obvious contrast or even nearly no contrast. As shown in FIG. 3, when the light incident angle θ is less than 90 degrees, the incident direction of the far infrared light L1 is not perpendicular to the depth direction D2 of the surface defect, the far infrared light L1 illuminates partial regions of the surface defect below the metallic surface 21, the partial regions of the surface defect receive illumination of the far infrared light L1 and produce reflected far infrared light and diffused far infrared light, and the photosensitive element 13 receives the reflected far infrared light and diffused far infrared light from the partial regions of the surface defect; more specifically, surface defects present images with brighter borders (for protruding defects, for example) or darker borders (for recessed defects, for example) in the detection image, such that the detection image has a better contrast.

Moreover, in a situation where the same light incident angle θ is less than 90 degrees, the photosensitive element 13 receives more reflected far infrared light and diffused far infrared light from shallower surface defects than from deeper surface defects, and compared to a surface defect having a greater depth-width ratio, a shallower surface defect presents a brighter image in the detection image. Furthermore, in a situation where the light incident angle θ is less than 90 degrees, as the light incident angle θ gets smaller, more reflected far infrared light and diffused far infrared light are produced in surface defects, the surface defects present brighter images in the detection image, and the brightness presented by a shallower surface defect in the detection image is also greater than the brightness presented by a deeper surface defect in the detection image. For example, a 30-degree light incident angle θ is less than a 60-degree light incident angle θ. Compared to a detection image corresponding to the 60-degree light incident angle θ, the surface defect presents higher brightness in a detection image corresponding to the 30-degree light incident angle θ. In addition, in the detection image corresponding to the 30-degree light incident angle θ, a shallower surface defect presents higher brightness in the detection image compared to a deeper surface defect.

On this basis, the value of the light incident angle θ and the brightness presented by a surface defect in a detection image have a negative correlation relationship. As the light incident angle θ gets smaller, a shallower surface defect presents a brighter image in a detection image; that is to say, in a situation where the light incident angle θ is smaller, it becomes more difficult for the image scanning system or the inspector to identify a shallower surface defect, but it is easier for the image scanning system or the inspector to identify a deeper surface defect according to a darker image. In contrast, as the light incident angle θ becomes larger, both of a deeper surface defect and a shallower surface defect present darker images in a detection image; that is to say, the image scanning system or the inspector is capable of identifying all surface defects in a situation where the light incident angle θ is larger.

Hence, the image scanning system or the inspector can set the corresponding light incident angle θ according to a predetermined hole depth d of a predetermined surface defect to be detected and the described negative correlation relationship. As shown in FIG. 1 and FIG. 2, the image scanning system further includes a light source adjustment component 16 coupled to the light source component 12. If detection for a predetermined deeper surface defect but not a predetermined shallower surface defect is desired, the light source adjustment component 16 can adjust the position of the light source component 12 according to the light incident angle θ calculated by using the described negative correlation relationship and thus set a smaller light incident angle θ in step S03. Furthermore, the light source adjustment component 16 drives the light source component 12 to output the far infrared light L1, such that the predetermined shallower surface defect presents a brighter image in the detection image and the predetermined deeper surface defect presents a darker image in the detection image. If detection for both predetermined shallower and deeper surface defects is desired, the light source adjustment component 16 can adjust the position of the light source component 12 according to the light incident angle θ calculated by using the described negative correlation relationship and thus set a larger light incident angle θ (e.g., 90 degrees) in step S03. Further, the light source adjustment component 16 drives the light source component 12 to output the far infrared light L1, such that the predetermined shallower and deeper surface defects both present shadows in the detection image.

For example, assuming that the object 2 is applied to a spindle of a safety belt component of an automobile, the foregoing surface defect can be a sand hole or an air hole caused by dust or air during the manufacturing process of the object 2, or a bump or a scratch, wherein the depth of the sand hole or the air hole is greater than that of the bump or the scratch. If detection for determining whether the object 2 contains sand holes or air holes is desired but detection for determining whether the object 2 contains bumps or scratches is not needed, the light source adjustment component 16 can adjust the position of the light source component 12 according to the light incident angle θ calculated by using the described negative correlation relationship and thus set a smaller light incident angle θ in step S03. Accordingly, a sand hole or an air hole presents lower brightness in the detection image, whereas a bump or a scratch presents higher brightness in the detection image, and the image scanning system or the inspector can quickly identify whether the object 2 contains sand holes or air holes. If detection for determining whether the object 2 contains bumps, scratches, sand holes and air holes is desired, the light source adjustment component 16 can adjust the position of the light source component 12 according to the light incident angle θ calculated by using the described negative correlation relationship and thus set a larger light incident angle θ in step S03. Accordingly, bumps, scratches, sand holes and air holes all present shadows in the detection image.

Figure 6:
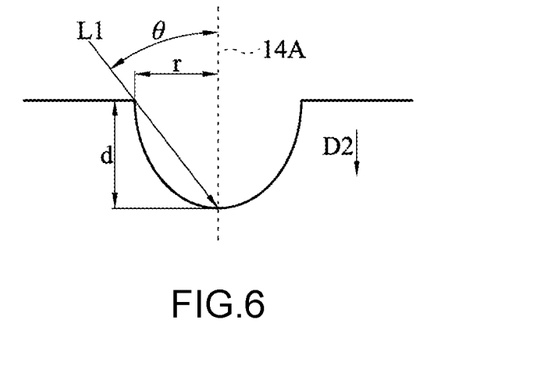
FIG. 6 is a schematic diagram of a predetermined surface corresponding to the object in FIG. 1 according to an embodiment.

In one embodiment, the light incident angle θ is associated with a predetermined aspect ratio of a predetermined surface defect to be detected. As shown in FIG. 6, taking the predetermined surface defect having a predetermined hole depth d and a predetermined hole radius r for example, the predetermined hole radius r is the distance between any lateral surface within the predetermined surface defect and the normal line 14A, and a ratio (r/d) of the predetermined hole radius r to the predetermined hole depth d is the aspect ratio (r/d) stated above, and the light incident angle θ is the arctangent (r/d). On this basis, the light source adjustment component 16 can adjust the position of the light source component 12 according to the aspect ratio (r/d) of the predetermined surface defect to be detected and thus set a threshold angle of the light incident angle θ as the arctangent (r/d) in step S03, wherein the light incident angle θ needs to satisfy the conditions of being equal to or more than the arctangent (r/d) and less than or equal to 90 degrees, and the light source adjustment component 16 drives the light source component 12 to output the far infrared light L1 after adjusting the position of the light source component 12. In some embodiments, the predetermined hole radius r can be set in advance according to the size of the surface defect expected to be detected at the object 2.

In one embodiment, as shown in FIG. 1 and FIG. 2, the image scanning system further includes a processor 15. The processor 15 is coupled to the driver component 11, the light source component 12, the photosensitive element 13 and the light source adjustment component 16. The processor 15 is for controlling operations of the components (e.g., the driver component 11, the light source component 12, the photosensitive element 13 and the light source adjustment component 16).

In some embodiments, the processor 15 is capable of calculating the light incident angle θ according to the described negative correlation relationship and the arctangent (r/d), and then drives the light source adjustment component 16 to adjust the position of the light source component 12 according to the light incident angle θ calculated.

Figure 7:
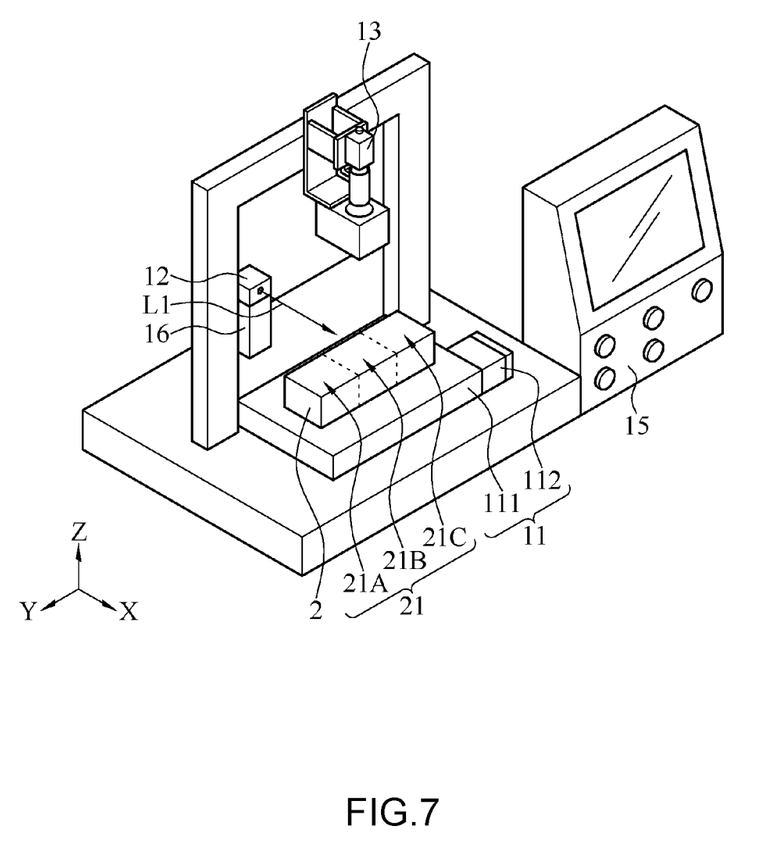
FIG. 7 is a schematic diagram of an image scanning system for a metallic surface according to another embodiment.
Figure 8:
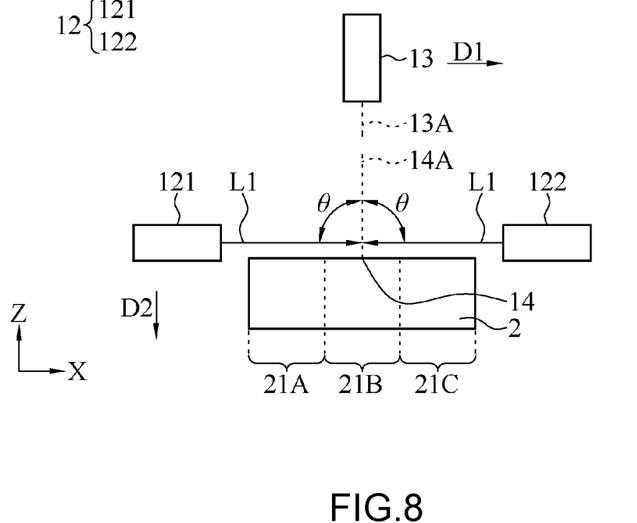
FIG. 8 is a schematic diagram of an implementation form of relative optical positions of the object, the light source component and the photosensitive element in FIG. 6.
Figure 9:
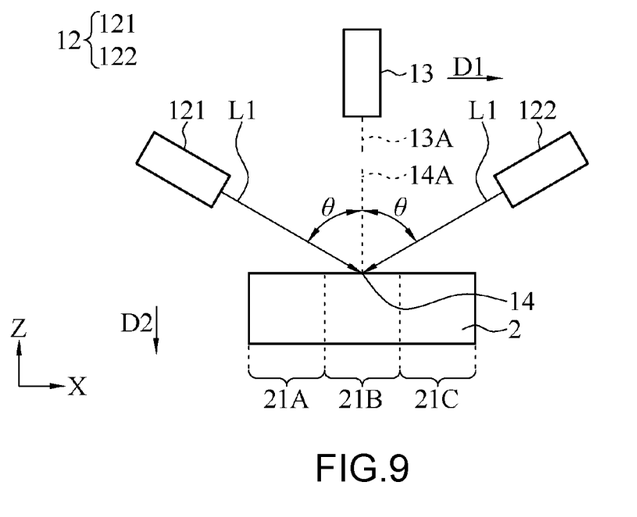
FIG. 9 is a schematic diagram of another implementation form of relative optical positions of the object, the light source component and the photosensitive element in FIG. 6.
Figure 10:
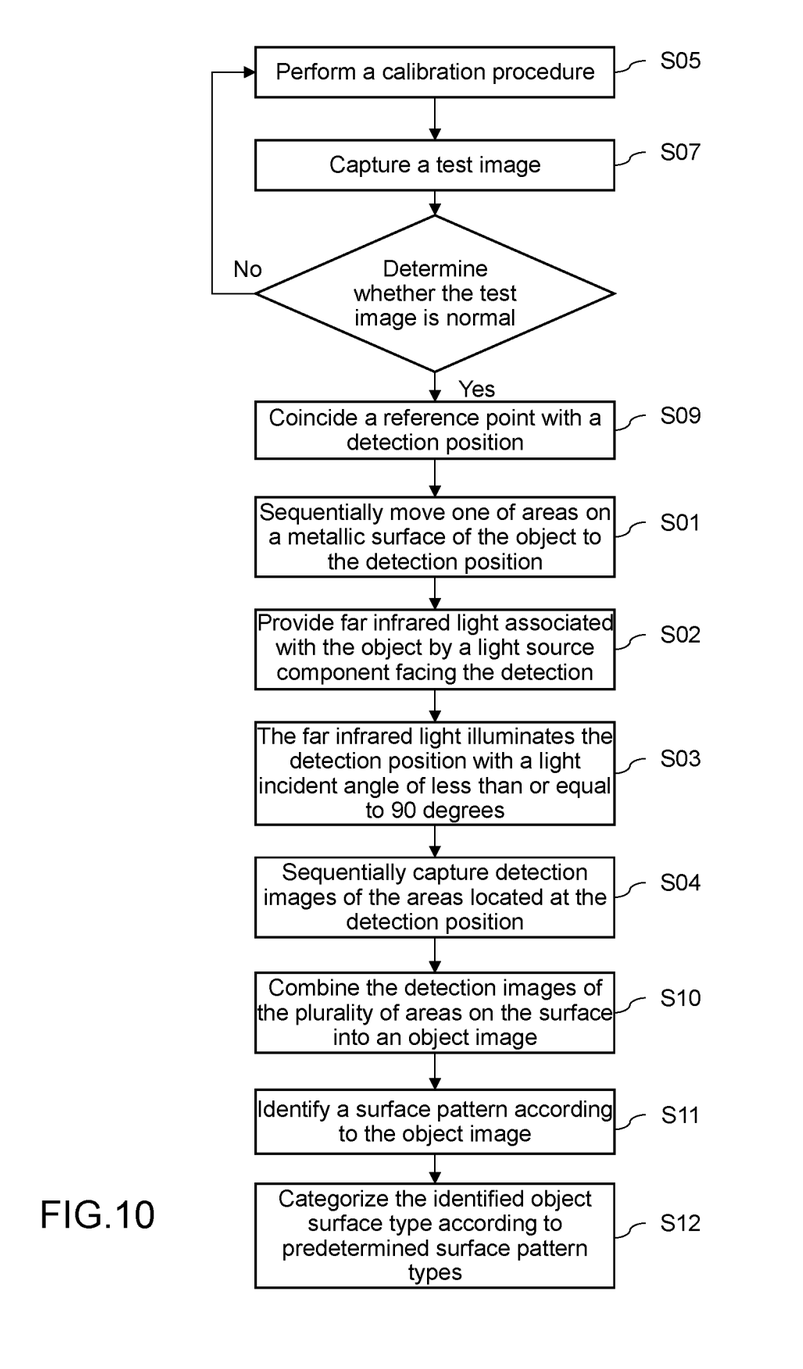
FIG. 10 is a flowchart of an image scanning method for a metallic surface according to another embodiment of the present disclosure.

In one embodiment, as shown in FIG. 1, FIG. 3 and FIG. 4, the object 2 is cylindrical, and the metallic surface 21 of the object 2 can be a lateral surface of the object 2; that is, the metallic surface 21 is a cylindrical surface and has a radian of 2π. Herein, as shown in FIG. 1 and FIG. 2, the driver component 11 includes a carrier element 111 and a step motor 112 connected to the carrier element 111. The carrier element 111 carries the object 2. In step S01, the step motor 112 can rotate in a clockwise direction or a counterclockwise direction, and drives the carrier element 111 to rotate so as to impel the object 2 to rotate. Taking the metallic surface 21 including the areas 21A to 21C for example, the step motor 112 can sequentially rotate by 120 degrees, so as to move the areas 21A to 21C to the detection position 14. In another embodiment, as shown in FIG. 7 to FIG. 9, the object 2 is a cuboid or a cube in shape, and the metallic surface 21 of the object 2 can be a non-curve surface having a curvature equal to zero or approximating zero. Herein, along an extension direction D1 of the metallic surface 21 of the object 2, the metallic surface 21 can be divided into the areas 21A to 21C. In step S01, the step motor 112 can drive the carrier element 111 to move parallel along the extension direction D1 perpendicular to the normal line 14A, so as to move the areas 21A to 21C to the detection position 14.

In some embodiments, the extension direction D1 can be a counterclockwise direction or a clockwise direction relative to the central axis of the object 2 as a rotation axis as shown in FIG. 1, or the long axis direction of the object 2 as shown in FIG. 7.

In one embodiment, as shown in FIG. 1 and FIG. 7, the light source component 12 can include a light emitting element. In another embodiment, as shown in FIGS. 3, 4, 8 and 9, the light source component 12 can include two light emitting elements 121 and 122, and the two light emitting elements 121 and 122 are symmetrically arranged on two opposite sides of the object 2 relative to the normal line 14A. The two light emitting elements 121 and 122 individually illuminate the detection position 14, the metallic surface 21 is illuminated by the symmetrical far infrared light L1 and symmetrical diffused far infrared light is thus produced, and the photosensitive element 13 sequentially captures the detection images of the areas 21A to 21C located at the detection position 14 according to the symmetrical diffused far infrared light, hence enhancing the imaging quality of the detection image. In some embodiments, the light emitting elements 121 and 122 can be implemented by one or more light emitting diodes; in some embodiments, each of the light emitting elements 121 and 122 can be implemented by a laser light source.

In one embodiment, the image scanning system further includes a test procedure and a coincidence procedure. The image scanning system sequentially performs the test procedure, the coincidence procedure and the foregoing detection procedure. The photosensitive element 13 captures a test image according to test light (i.e., far infrared light) in the test procedure. In the coincidence procedure, the object 2 has a predetermined reference point, the driver component 11 moves the object 2 to coincide the predetermined reference point of the object 2 with the detection position 14, and when the predetermined reference point of the object 2 is coincided with the detection position 14, the driver component 11 uses the predetermined reference point of the object 2 as a starting position and sequentially moves the areas 21A to 21C on the metallic surface 21 to the detection position 14.

More specifically, referring to FIGS. 1, 2, 7 and 10, the processor 15 is coupled between the photosensitive element 13 and the driver component 11. In the test procedure, the photosensitive element 13 captures a test image (step S07), and the processor 15 receives the test image captured by the photosensitive element 13, determines whether the test image is normal (step S08), and accordingly determines whether to drive the driver component 11 to perform the coincidence procedure. If the test image is normal, it means that the photosensitive element 13 is capable of capturing a normal detection image in step S04 in the detection procedure. The processor 15 generates a coincidence signal after determining that the test image is normal (a determination result of "yes"), and the driver component 11 receives the coincidence signal from the processor 15 and moves the object 2 to coincide the object 2 with the detection position 14 according to the coincidence signal (step S09). After the object 2 is coincided with the detection position 14, the image scanning system enters the detection procedure, the driver component 11 sequentially moves the areas 21A to 21C to the detection position 14 in the detection procedure (step S01), the light source component 12 provides the far infrared light L1 to illuminate the detection position 14 in the detection procedure (step S02 and step S03), and the photosensitive element 13 sequentially captures the detection images of the areas 21A to 21C located at the detection position 14 (step S04). The repeated details are omitted herein.

In one embodiment, as shown in FIG. 2, the processor 15 is coupled to the step motor 112. In step S09, the processor 15 can send the coincidence signal to control the step motor 112, such that the step motor 112 rotates to drive the carrier element 111 to move or rotate so as to coincide the object 2 with the detection position 14.

In one embodiment, the photosensitive element 13 can be implemented by a linear image sensor or a planar image sensor. For example, the light source component 12 is a linear far infrared light source for providing linear far infrared light as the far infrared light L1. After the photosensitive element 13 captures the detection images of the areas 21A to 21C on the metallic surface 21, the processor 15 receives from the photosensitive element 13 the detection images of the areas 21A to 21C on the metallic surface 21 and combines the detection images of the areas 21A to 21C on the metallic surface 21 into an object image (step S10), and the image scanning system or the inspector can determine whether the metallic surface 21 of the object 2 in overall includes surface defects according to the object image generated from the combination of the detection images.

Figure 12:
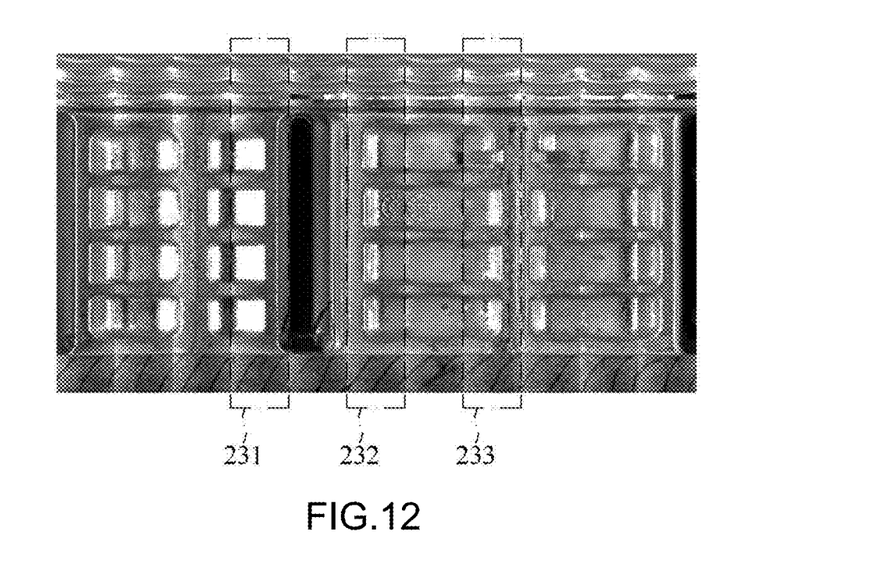
FIG. 12 is a schematic diagram of one object image in FIG. 11 according to an embodiment.

In one embodiment, referring to FIG. 7, one single photosensitive element 13 can be provided for the image scanning system for a metallic surface, and the photosensitive element 13 is used to perform image capturing of multiple areas 21A to 21C on the metallic surface 21 so as to obtain multiple detection images respectively corresponding to the areas 21A to 21C on the metallic surface 21. Then, the processor 15 combines the detection images of the areas 21A to 21C on the metallic surface 21 into an object image. In some embodiments, if the object 2 is cylindrical, the one single photosensitive element 13 can perform image capturing of multiple areas 21A to 21C of the middle section of the object 2 to obtain multiple detection images respectively corresponding to the areas 21A to 21C, and the processor 15 then combines the detection images of the areas 21A to 21C into an object image 23, as shown in FIG. 12, which shows an example of detection images 231, 232 and 233 of the three areas 21A to 21C on the metallic surface 21.

Figure 11:
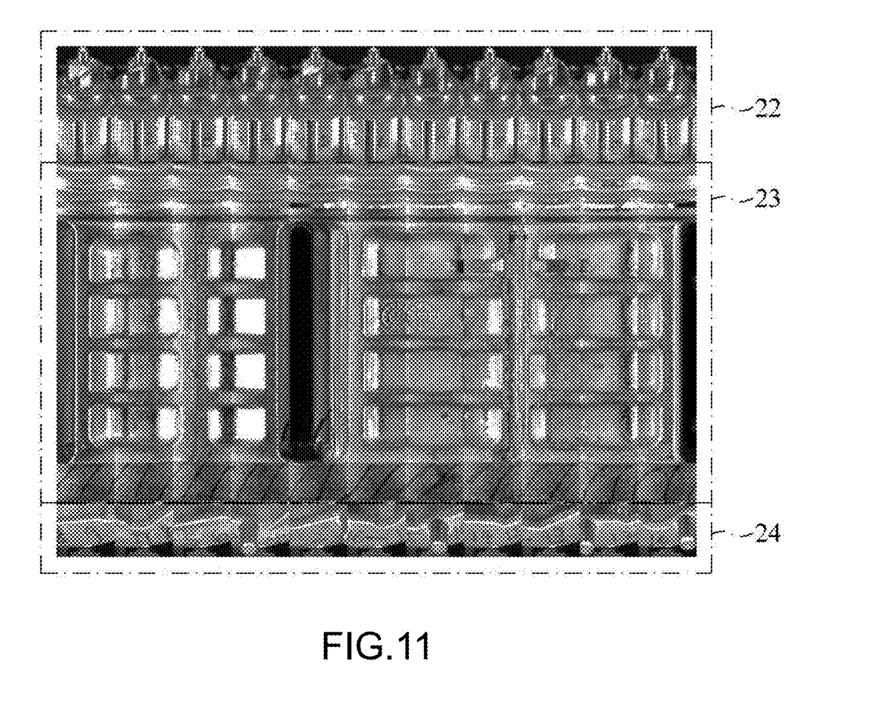
FIG. 11 is a schematic diagram of an object image including sub object images according to an embodiment.

In one embodiment, as shown in FIG. 1, multiple photosensitive elements 13 can be provided for the image scanning system for a metallic surface, and the photosensitive elements 13 respectively capture detection images of areas on a surface of the object 2 at different section positions located at the detection position 14. For example, taking a spindle as the object 2 for example, as shown in FIG. 1, one end of the object 2 is a narrower structure, the photosensitive elements 13 can be three in quantity, and the processor 15 forms an object image of the object 2 according to the detection images captured by the three photosensitive elements 13, as shown in FIG. 11. The object image includes a sub object image 22 (the upper section of the object image in FIG. 11) combined from the detection images of the areas 21A to 21C obtained by the first photosensitive element of the three photosensitive elements 13, a sub object image 23 (the middle section of the object image in FIG. 11) combined from the detection images of the areas 21A to 21C obtained by the second photosensitive element of the three photosensitive elements 13, and a sub object image 24 (the lower section of the object image in FIG. 11) combined from the detection images of the areas 21A to 21C obtained by the third photosensitive element of the three photosensitive elements 13.

In one embodiment, the processor 15 can automatically determine whether the metallic surface 21 of the object 2 contains surface defects according to the object image generated from combining the detection images. More specifically, the processor 15 includes an artificial neural network system, which has a learning phase and a prediction phase. In the learning phase, the object image inputted into the artificial neural network system contains known surface defects, and after the object image with known surface defects is inputted, the artificial neural network system performs deep learning according to the known surface defects and the surface defect type (hereinafter referred to as a predetermined surface defect type) of the known surface defects to build a predictive model (formed by a plurality of hidden layers sequentially connected, wherein each hidden layer includes one or more neurons, each of which performs a determination item). In other words, in the learning phase, the object image with known surface defects is used to generate determination items of the neurons and/or to adjust a connection weighting of any two neurons, such that a prediction result (i.e., the predetermined surface defect type outputted) of each object image conforms to the known surface defects.

For instance, taking a sand hole or an air hole, a bump or a scratch as the foregoing surface defect as an example, image blocks presenting different surface patterns can be image blocks with images of sand holes of different depths, image blocks without images of sand holes but with images of bumps or scratches, image blocks with images of different levels of surface roughness, image blocks without images of surface defects, or image blocks with images of surface defects with different contrasts and thus different aspect ratios as a result of illuminating the areas 21A to 21C by the far infrared light L1 of different light wavelengths. Herein, the artificial neural network system performs deep learning according to the object images of different surface patterns described above, so as to build a predictive model for identifying various surface patterns. In addition, the artificial neural network system can categorize object images having different surface patterns to generate in advance different predetermined surface defect types. Thus, in the prediction phase, after the object image is generated and inputted into the artificial neural network system, the artificial neural network system executes the foregoing predictive model according to the object image generated from combining the detection images, so as to identify the object image presenting the surface pattern of the object 2 in the object image (step S11 in FIG. 10). Moreover, the object image is categorized by the predictive model, that is, the artificial neural network system categorizes the object image having the surface pattern of the object 2 according to the plurality of predetermined surface defect types (step S12 in FIG. 10). At an output terminal, the object image undergoes percentile prediction according to the predetermined surface defect types, that is, the percentage of possibility of falling within the individual types is predicted.

For instance, taking the areas 21A to 21C on the metallic surface 21 for example, the artificial neural network system executes the predictive model according to the combined object images of the areas 21A to 21C, and can use the object image of the object 2 to identify that the area 21A contains sand holes and bumps, the area 21B does not contain any surface defects, the area 21C contains only sand holes, and the surface roughness of the area 21A is greater than the surface roughness of the area 21C. Next, assuming that the predetermined surface defect types include five types, namely, containing sand holes or air holes, containing scratches or bumps, having a high level of roughness, having a low level of roughness, and without any surface defects, the artificial neural network system can categorize the detection image of the area 21A to the predetermined types of containing sand holes or air holes and containing scratches or bumps, categorize the detection image of the area 21B to the predetermined type of without any surface defects, and categorize the detection image of the area 21C to the predetermined type of containing sand holes or air holes, and can further categorize the detection image of the area 21A to the predetermined type of having a high level of roughness and categorize the detection images of the areas 21B and 21C to the predetermined type of having a low level of roughness. Herein, by identifying different surface patterns using the artificial neural network system, the efficiency of surface detection is significantly enhanced, and the probability of human misjudgment is also reduced.

In one embodiment, the deep learning of the foregoing artificial neural network system can be implemented by, for example but not limited to, a convolutional neural network (CNN) algorithm.

In one embodiment, the photosensitive element 13 is the foregoing linear image sensor that has a field of vision (FOV) of approximately 0 degree. After the processor 15 receives the detection images of the areas 21A to 21C captured by the photosensitive element 13, in step S10, the processor 15 is not required to additionally perform image processing according to the detection images of the areas 21A to 21C but can directly combine the detection images of the areas 21A to 21C into the object image.

In another embodiment, the photosensitive element 13 is the foregoing planar image sensor that has a field of view of approximately 5 degrees to 30 degrees. In the detection images acquired from capturing two-dimensional images of the areas 21A to 21C by the photosensitive element 13, with regard to short sides of the detection images, the middle regions of the detection images have better imaging quality compared to other regions outside the middle regions. Herein, after the processor 15 receives the detection images of the areas 21A to 21C captured by the photosensitive element 13, the processor 15 captures the middle regions of the detection images on the basis of the short sides of the detection images in step S10. More specifically, in step S10, the processor 15 can capture the middle regions of the detection images according to a predetermined viewing angle within the field of view of the planar image sensor. For example, the predetermined viewing angle can be 1 degree, and the processor 15 captures the middle regions of the detection images corresponding to the 1-degree predetermined viewing angle, e.g., the middle region having a width of one pixel, and the processor 15 further combines the middle regions of the detection images into the object image, so as to avoid merging other regions in the detection images having poorer imaging quality into the object image, further enhancing the accuracy of the artificial neural network system in identifying surface patterns of the object 2.

In one embodiment, in step S07, the photosensitive element 13 can capture the image of any of the areas 21A to 21C on the metallic surface 21 as the test image, and the processor 15 can compare whether the average brightness of the test image satisfies predetermined brightness in step S08 to determine whether the test image is normal. If the average brightness of the test image does not satisfy the predetermined brightness (a determination result of "no"), it means that the test image is abnormal, that is, the light incident angle $\theta$ set by the light source adjustment component 16 cannot accurately reflect the predetermined hole depth d of the predetermined surface defect to be detected. At this point, the image scanning system performs a calibration procedure (step S05), and the processor 15 in the calibration procedure controls the light source adjustment component 16 to again adjust the position of the light source component 12 according to the described negative correlation relationship or the arctangent (r/d) to again set the light incident angle $\theta$. The light source adjustment component 16 drives the light source component 12 to emit another far infrared test light having a different light incident angle $\theta$ after again adjusting the position of the light source component 12, such that the photosensitive element 13 captures the image of any one of the areas 21A to 21C according to the another far infrared test light (step S07) to generate another test image, and the processor 15 can again compare whether the average brightness of the another test image satisfies the foregoing predetermined brightness (step S08). If the average brightness of the another test image still does not satisfy the predetermined brightness (a determination result of "no"), the processor 15 controls the light source adjustment component 16 to again adjust the position of the light source component 12 and hence again adjust the light incident angle $\theta$ (step S05), until the average brightness of the test image captured by the photosensitive element 13 satisfies the predetermined brightness. If the average brightness of the test image satisfies the predetermined brightness, the processor 15 determines in step S08 that the test image is normal (a determination result of "yes"), and the image scanning system then performs subsequent step S09 to perform the coincidence procedure and the detection procedure described above.

In conclusion of the description above, according to the image scanning method for a metallic surface and the image scanning system thereof in embodiments of the present disclosure, a detection image of the metallic surface 21 of the object 2 having a surface attachment can be generated for subsequent surface detection of the object 2. Thus, an inspector is able to determine whether the metallic surface 21 of the object 2 contains a surface defect without having to remove the attachment from the metallic object 21 of the object 2, such that a surface destructive cleaning procedure can be avoided to further significantly enhance the efficiency of surface detection and to reduce costs of preparatory procedures needed for detection. In some embodiments, according to the image scanning method for a metallic surface and the image scanning system thereof of the present disclosure, the photosensitive element 13 is enabled to obtain a low-disturbance detection image by adjusting parameters such as the light intensity, the light incident angle $\theta$ and the light wave polarization direction of the far infrared light L1 emitted by the light source component 12. In some embodiments, according to the image scanning method for a metallic surface and the image scanning system thereof of the present disclosure, an artificial neural network system can perform deep learning according to an object image formed from combining detection images and thus build a predictive model for identifying a surface pattern of an object, further identifying and categorizing different surface patterns of the object 2 by using the predictive model, thereby significantly enhancing the efficiency of object detection, as well as reducing the possibility of human misjudgment.

The present disclosure is explained by way of the disclosed embodiments that are not to be construed as limitations to the present disclosure. Without departing from the spirit and purview of the present disclosure, a person of ordinary skill in the art could make slight modifications and changes. Therefore, the legal protection of the present disclosure shall be defined by the appended claims.

What is claimed is:

1. An image scanning method for a metallic surface, comprising:
    sequentially moving one of a plurality of areas on a metallic surface of an object to a detection position;
    providing far infrared light by a light source component facing the detection position, wherein a light wavelength of the far infrared light is associated with the object;
    the far infrared light illuminating the detection position with a light incident angle of less than or equal to 90 degrees relative to a normal line of the area located at the detection position; and
    capturing a detection image of each of the areas sequentially located at the detection position by a photosensitive element according to the far infrared light, wherein the photosensitive element faces the detection position and a photosensitive axis of the photosensitive element is parallel to the normal line, wherein the step of capturing the detection image of each of the areas sequentially located at the detection position by the photosensitive element according to the far infrared light comprises receiving the plurality of detection images of the plurality of areas, and combining the plurality of detection images into an object image; and
    performing a prediction procedure according to the object image to identify in the object image a regional image presenting a surface structure of the object.

2. The image scanning method for a metallic surface according to claim 1, wherein the object comprises a body having the metallic surface and an attachment located on the metallic surface of the body, and the light wavelength of the far infrared light is greater than a thickness of the attachment.

3. The image scanning method for a metallic surface according to claim 1, wherein the step of providing the far infrared light by the light source component facing the detection position comprises:
    providing linear infrared light.

4. The image scanning method for a metallic surface according to claim 1, wherein the step of sequentially moving the plurality of areas on the surface to the detection position comprises:
    rotating the object in a clockwise direction or a counter-clockwise direction to move the plurality of areas on the surface to the detection position.

5. The image scanning method for a metallic surface according to claim 1, further comprising:
    polarizing the far infrared light.

6. The image scanning method for a metallic surface according to claim 1, further comprising:
    adjusting the light incident angle.

7. The image scanning method for a metallic surface according to claim 1, further comprising:
    adjusting a light intensity of the far infrared light.

8. The image scanning method for a metallic surface according to claim 1, wherein the step of capturing the detection image of each of the areas sequentially located at the detection position by the photosensitive element according to the far infrared light comprises:
    capturing a two-dimensional image of the area to obtain the detection image.

9. The image scanning method for a metallic surface according to claim 8, wherein the step of receiving the plurality of detection images of the plurality of areas and combining the plurality of detection images into the object image comprises the steps of;
    capturing middle regions of the detection images based on short sides of the detection images, and combining the plurality of middle regions into the object image.

10. An image scanning system for a metallic surface, comprising:
    a driver component carrying an object, a metallic surface of the object being divided into a plurality of areas along an extension direction, the driver component being further used for sequentially moving one of the plurality of areas to a detection position;
    a light source component configured to face the detection position, providing far infrared light to illuminate the detection position, wherein a light wavelength of the far infrared light is associated with the object, and a light incident angle of the far infrared light relative to a normal line of the area located at the detection position is less than or equal to 90 degrees;
    a photosensitive element configured to face the detection position, capturing a detection image of each of the areas sequentially located at the detection position, wherein a photosensitive axis of the photosensitive element is parallel to the normal line; and
    a processor coupled to the photosensitive element, receiving the plurality of detection images of the plurality of areas, and combining the plurality of detection images into an object image, the processor further comprising an artificial neural network system for performing a prediction procedure according to the object image to identify in the object image a regional image presenting a surface structure of the object.

11. The image scanning system for a metallic surface according to claim 10, wherein the object comprises a body having the metallic surface and an attachment located on the metallic surface of the body, and the light wavelength of the far infrared light is greater than a thickness of the attachment.

12. The image scanning system for a metallic surface according to claim 10, wherein the light source component is a linear far infrared light source.

13. The image scanning system for a metallic surface according to claim 10, wherein the photosensitive element is a linear image sensor.

14. The image scanning system for a metallic surface according to claim 10, wherein the driver component comprises:
    a carrier element carrying the object; and
    a step motor connected to the carrier element, rotating the carrier element in a clockwise direction or a counter-clockwise direction relative to the photosensitive element to impel the object to rotate.

15. The image scanning system for a metallic surface according to claim 10, further comprising:
a polarizing sheet located on the optical axis of the photosensitive element, and configured between the photosensitive element and the detection position.

16. The image scanning system for a metallic surface according to claim 10, further comprising:
a light source adjustment component connected to the light source component, for adjusting the light incident angle.

17. The image scanning system for a metallic surface according to claim 10, further comprising:
a light source adjustment component connected to the light source component, for adjusting a light intensity of the far infrared light.

18. The image scanning system for a metallic surface according to claim 10, wherein the photosensitive element is a planar image sensor.

19. The image scanning system for a metallic surface according to claim 18,
wherein the processor captures middle regions of the detection images based on short sides of the detection images, and combines the plurality of middle regions into the object image.

20. An image scanning system for a metallic surface, comprising:
a driver component carrying an object, a metallic surface of the object being divided into a plurality of areas along an extension direction, the driver component being further used for sequentially moving one of the plurality of areas to a detection position;
a light source component configured to face the detection position, providing far infrared light to illuminate the detection position, wherein a light wavelength of the far infrared light is associated with the object, and a light incident angle of the far infrared light relative to a normal line of the area located at the detection position is less than or equal to 90 degrees; and
a photosensitive element configured to face the detection position, capturing a detection image of each of the areas sequentially located at the detection position, wherein a photosensitive axis of the photosensitive element is parallel to the normal line;
wherein the object comprises a body having the metallic surface and an attachment located on the metallic surface of the body, and the light wavelength of the far infrared light is greater than a thickness of the attachment.

21. The image scanning system for a metallic surface according to claim 20, wherein the object comprises a body having the metallic surface and an attachment located on the metallic surface of the body, and the light wavelength of the far infrared light is greater than a thickness of the attachment.

22. The image scanning system for a metallic surface according to claim 20, wherein the light source component is a linear far infrared light source.

23. The image scanning system for a metallic surface according to claim 20, wherein the photosensitive element is a linear image sensor.

24. The image scanning system for a metallic surface according to claim 20, further comprising:
a polarizing sheet located on the optical axis of the photosensitive element, and configured between the photosensitive element and the detection position.

25. The image scanning system for a metallic surface according to claim 20, further comprising:
a light source adjustment component connected to the light source component, for adjusting the light incident angle.

26. The image scanning system for a metallic surface according to claim 20, further comprising:
a light source adjustment component connected to the light source component, for adjusting a light intensity of the far infrared light.

* * * * *